United States Patent
Shi et al.

(10) Patent No.: US 12,488,068 B2
(45) Date of Patent: Dec. 2, 2025

(54) PERFORMANCE-ADAPTIVE SAMPLING STRATEGY TOWARDS FAST AND ACCURATE GRAPH NEURAL NETWORKS

(71) Applicant: Microsoft Technology Licensing, LLC, Redmond, WA (US)

(72) Inventors: Baoxu Shi, San Jose, CA (US); Qi He, San Jose, CA (US); Jaewon Yang, Campbell, CA (US); Sufeng Niu, Fremont, CA (US); Minji Yoon, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1059 days.

(21) Appl. No.: 17/399,797

(22) Filed: Aug. 11, 2021

(65) Prior Publication Data
US 2023/0049817 A1    Feb. 16, 2023

(51) Int. Cl.
| G06N 3/08 | (2023.01) |
| G06F 18/20 | (2023.01) |
| G06F 18/21 | (2023.01) |
| G06F 18/211 | (2023.01) |
| G06F 18/2431 | (2023.01) |

(52) U.S. Cl.
CPC ............ *G06F 18/29* (2023.01); *G06F 18/211* (2023.01); *G06F 18/217* (2023.01); *G06F 18/2431* (2023.01); *G06N 3/08* (2013.01)

(58) Field of Classification Search
CPC ...... G06F 18/29; G06F 18/211; G06F 18/217; G06F 18/2431; G06F 18/00; G06F 18/2115; G06F 18/21; G06F 18/20; G06N 3/08; G06N 3/048; G06N 3/0464; G06N 3/084; G06N 3/00; G06N 3/02; G06N 3/0985

See application file for complete search history.

(56) References Cited

U.S. PATENT DOCUMENTS

2021/0232918 A1*   7/2021   Cheng ...................... G06N 3/08
2021/0406779 A1*  12/2021   Hu ......................... G06N 3/045

OTHER PUBLICATIONS

Cong et al., "Minimal Variance Sampling with Provable Guarantees for Fast Training of Graph Neural Networks" (Year: 2020).*
Anonymous, "A Synaptic Neural Network and Synapse Learning" (Year: 2019).*

(Continued)

*Primary Examiner* — Brian M Smith
(74) *Attorney, Agent, or Firm* — Nicholson De Vos Webster & Elliott LLP

(57) ABSTRACT

Techniques for implementing a performance-adaptive sampling strategy towards fast and accurate graph neural networks are provided. In one technique, a graph that comprises multiple nodes and edges connecting the nodes is stored. An embedding for each node is initialized, as well as a sampling policy for sampling neighbors of nodes. One or more machine learning techniques are used to train a graph neural network and learn embeddings for the nodes. Using the one or more machine learning techniques comprises, for each node: (1) selecting, based on the sampling policy, a set of neighbors of the node; (2) based on the graph neural network and embeddings for the node and the set of neighbors, computing a performance loss; and (3) based on a gradient of the performance loss, modifying the sampling policy.

22 Claims, 8 Drawing Sheets

(56) References Cited

OTHER PUBLICATIONS

Oh, J. et al., "Advancing graphsage with a data-driven node sampling," downloaded from <arxiv.org/abs/1904.12935> (Apr. 29, 2019) 6 pp. (Year: 2019).*
Lai, K.-W et al., "Policy-gnn: aggregation optimization for graph neural networks," Proc. of the 26th ACM SIGKDD Conf. on Knowledge Discovery and Data Mining (Aug. 2020) 11 pp. (Year: 2020).*
"AS-GCN in Tensorflow", Retrieved from: https://github.com/huangwb/AS-GCN, Nov. 28, 2020, 2 Pages.
"GeniePath-BS: GeniePath with Bandit Sampler", Retrieved from: https://web.archive.org/web/20201029070738/https://github.com/xavierzw/ogb-geniepath-bs, Oct. 29, 2020, 2 Pages.
Bahdanau, et al., "Neural Machine Translation by Jointly Learning to Align and Translate", In Repository of arXiv:1409.0473v3, Oct. 7, 2014, 15 Pages.
Battaglia, et al., "Relational Inductive Biases, Deep learning, and Graph Networks", In the Repository of arXiv:1806.01261, Jun. 4, 2018, 37 Pages.
Buja, et al., "Interactive high-dimensional data visualization", In Journal of computational and graphical statistics, vol. 5, Issue 1, Mar. 1996, pp. 78-99.
Chen, et al., "Fastgcn: fast learning with graph convolutional networks via importance sampling", In Repository of arXiv: 1801.10247v1, Jan. 30, 2018, pp. 1-15.
Dai, et al., "Discriminative embeddings of latent variable models for structured data", In Proceedings of the 33rd International Conference on International Conference on Machine Learning, vol. 48, Jun. 19, 2016, pp. 2702-2711.
Faloutsos, et al., "On power-law relationships of the internet topology", In Proceedings of ACM SIGCOMM Computer Communication Review, vol. 29, Issue 4, Oct. 1999, pp. 251-262.
Fout, et al., "Protein interface prediction using graph convolutional networks", In Proceedings of the 31st International Conference on Neural Information Processing Systems, Dec. 2017, pp. 1-10.
Hamilton, et al., "GraphSage: Representation Learning on Large Graphs", Retrieved from: https://web.archive.org/web/20201106152716/https://github.com/williamleif/GraphSAGE, Nov. 6, 2020, 5 Pages.
Hamilton, et al., "Inductive Representation Learning on Large Graphs", In Proceeding of 31st Conference on Neural Information Processing Systems, Dec. 2017, pp. 1-19.
Hu, et al., "Convolutional Neural Network Architectures for Matching Natural Language Sentences", In Proceedings of the 27th International Conference on Neural Information Processing Systems—vol. 2, Dec. 8, 2014, pp. 1-9.
Huang, et al., "Adaptive sampling towards fast graph representation learning", In Proceedings of 32nd Conference on Neural Information Processing Systems, Dec. 3, 2018, pp. 1-10.
Kingma, et al., "Adam: A Method for Stochastic Optimization", In Repository of arXiv:1412.6980v1, Dec. 22, 2014, 9 Pages.
Kipf, et al., "Semi-Supervised Classification with Graph Convolutional Networks", In Repository of arXiv:1609.02907v1, Sep. 9, 2016, pp. 1-10.
Krizhevsky, et al., "ImageNet Classification with Deep Convolutional Neural Networks", In Advances in Neural Information Processing Systems, Dec. 2012, pp. 1-9.
Liu, et al., "Bandit Samplers for Training Graph Neural Networks", In Repository of arXiv:2006.05806v2, Jun. 11, 2020, 18 Pages.
Mohamed, et al., "Monte carlo gradient estimation in machine learning", In Repository of https://arxiv.org/pdf/1906.10652v1.pdf, Jun. 25, 2019, pp. 1-59.
Schlichtkrull, et al., "Modeling relational data with graph convolutional networks", In European Semantic Web Conference, Jun. 3, 2018, 10 Pages.
Sen, et al., "Collective classification in network data", In Journal of AI Magazine, Sep. 6, 2008, pp. 93-106.
Shchur, et al., "Pitfalls of graph neural network evaluation", In Repository of arXiv:1811.05868v1, Nov. 14, 2018, pp. 1-11.
Shi, et al., "Representation Learning in Heterogeneous Professional Social Networks with Ambiguous Social Connections", In Proceedings of IEEE International Conference on Big Data (Big Data), Dec. 9, 2019, pp. 1928-1937.
Sutton, et al., "Reinforcement Learning: An Introduction", In Publication of The MIT Press, Jan. 1, 2018, 444 Pages.
Zhou, et al., "Layer-Dependent Importance Sampling for Training Deep and Large Graph Convolutional Networks", In Proceedings of 33rd Conference on Neural Information Processing Systems, Nov. 2019, 10 Pages.
Veličković, et al., "Graph Attention Networks", In Repository of arXiv:1710.10903, Oct. 30, 2017, pp. 1-11.
Williams, Ronaldj. , "Simple statistical gradient-following algorithms for connectionist reinforcement learning", In Journal of Machine Learning, vol. 8, Issue 3-4, May 1992, 27 Pages.

\* cited by examiner

PERFORMANCE-ADAPTIVE SAMPLING STRATEGY TOWARDS FAST AND ACCURATE GRAPH NEURAL NETWORKS

TECHNICAL FIELD

The present disclosure relates to generating machine-learned embeddings and, more particularly, to modifying a sampling technique to decrease the time to train graph neural networks while increasing their accuracy.

BACKGROUND

Modern content platforms aim to provide relevant content to users who visit their respective platforms. There are many ways to determine relevant content to present to users. For example, if users A and B have viewed content item C and user A also viewed content item D, then content item B is a candidate content item to recommend to user B. More sophisticated techniques have arisen when more information is known about users and about the content items with which they have interacted. For example, profile attributes of multiple users in addition to their content consumption history may be analyzed to determine which profile attributes correlate with the type of content. Then, users with those profile attributes may be recommended content items of the same or similar type.

More sophisticated techniques have been developed recently to model every possible entity (e.g., user, user attribute, organization, organization attribute, content item, and content item attribute, or anything that can be associated with a user or content item) as an embedding, which is a vector of real values. If two embeddings are very similar to each other, then the entities that the two embeddings represent are considered similar. For example, if a user embedding is similar to a job embedding, then a job that is represented by the job embedding may be recommended to the user that is represented by the user embedding. In order to learn an embedding for a particular entity, then embeddings of entities that are connected (in a entity graph) to the particular entity are considered. For example, embeddings for job title, job function, industry, and skills of a user are used to generate an embedding for the user. As another example, embeddings for content items and pages that a user has clicked on or liked are used to generate an embedding for the user.

Because much electronic data regarding entities and their relationships with each other is structured and can be modeled as a graph, graph convolutional networks (GCNs) have become an important tool for graph representation learning. A significant challenge of adapting GCNs to large-scale graphs is the scalability issue due to neighborhood expansion in the aggregation stage. For example, to compute an embedding for an entity, it is common to consider the embeddings of entities that are two or three degrees away for the entity. Many entities have tens or hundreds of first order connections, which are entities that are just one degree away in the graph. If all the available data was used to learn the embeddings, then the time and computer resources required to learn the embeddings would be significant. For example, it may take days to learn the embeddings or may require 100% utilization of one or more computer clusters that normally process user requests for content. Thus, current approaches for learning embeddings are not scalable.

Accordingly, sampling algorithms have been proposed to limit the neighborhood expansion by randomly sampling a fixed number of neighbors. For example, twenty first order connections are identified for a particular entity and, for each connection in the twenty first order connections, another twenty connections are identified. Thus, four hundred second order connections are identified for the particular entity.

However, a random sampling of an entity's neighbors can result in a relatively high amount of variance. "Variance" refers to the difference between (a) the embeddings that are learned through a sampling technique and (b) the embeddings that would have been learned without sampling neighbors. Embeddings that would have been learned without sampling may be considered "true" embeddings. An approximation of true variance would be learning embeddings for entities in a graph at two different times using random sampling, which may result in learning very different embeddings for the same entities.

Accordingly, sampling techniques have been developed to reduce or minimize variance. However, such variance-reducing sampling techniques lead to two main problems: low accuracy (because the sampling technique is agnostic to the performance of the target task); and vulnerability to noise or adversarial attacks on the graph. For example, malicious users may create false accounts representing users in the graph and then create many connections with other users, including legitimate users. Such false accounts and entities, if sampled, reduces the accuracy of learned embeddings.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for performance-adaptive sampling of neighbors in a graph are provided. The sampled neighbors are informative for a target task. Techniques described herein optimize directly towards task performance as opposed to variance reduction. Such techniques involve propagating gradients of task performance loss through GNNs and a non-differentiable sampling operation. The identity of which neighbors are informative are learned from the gradients and those neighbors are assigned higher sampling probabilities.

Embodiments improve computer-related technology; namely, a neighbor sampling technique that is scalable and improves accuracy of the resulting embeddings that are machine-learned. In fact, embodiments require less computing resources, meaning that embeddings can be refreshed more frequently, such as every few days rather than monthly. This is possible because optimizing the sampling policy for task performance allows an embedding to choose which neighbors to move towards, leading to the minimum loss more efficiently.

Extensive experiments have shown that embodiments outperform current models (that rely on embeddings learned using traditional sampling methods) by up to 10% accuracy on public benchmarks and up to 53% accuracy in the presence of adversarial attacks. With more accurately learned embeddings, a variety of downstream tasks are improved, such as node classifications and entity-to-user recommendations for various types of entities, such as skills, jobs, and other users.

System Overview

Figure 1:
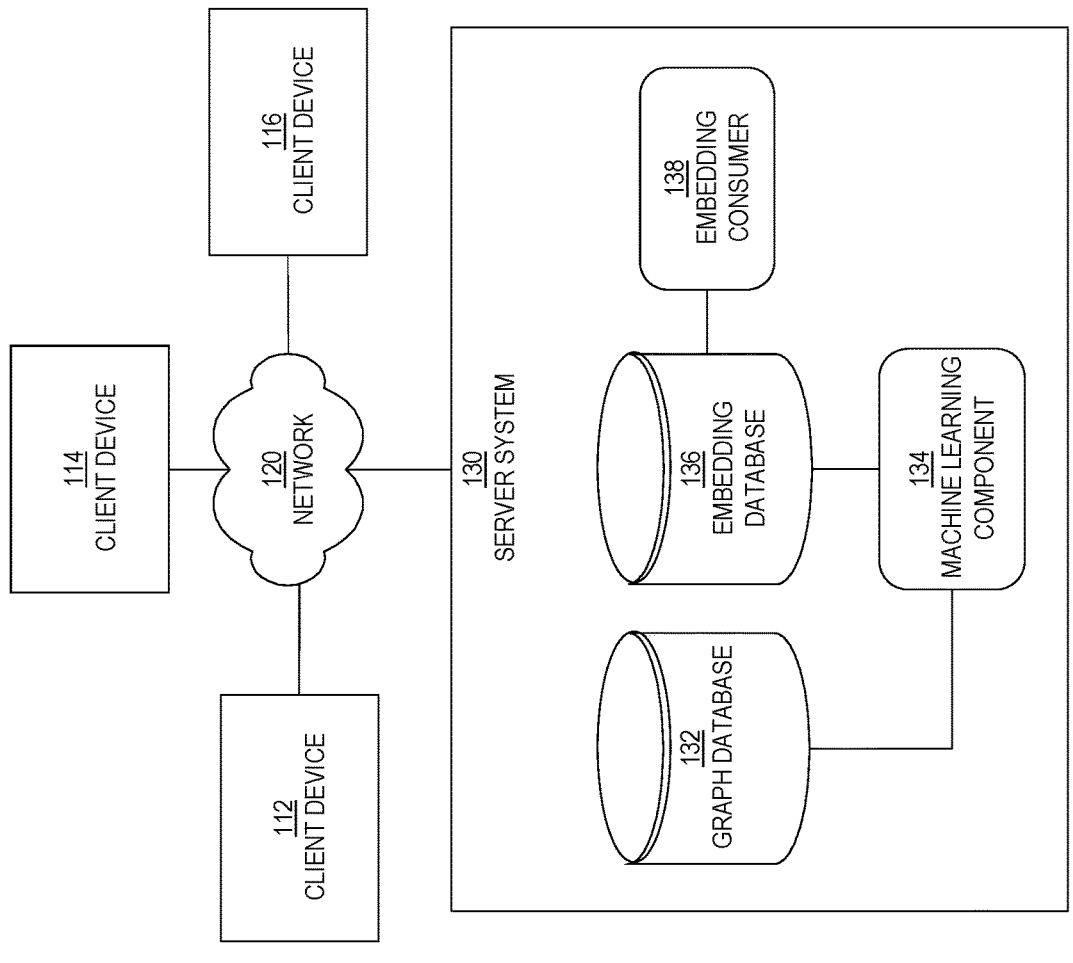
FIG. 1 is a block diagram that depicts an example system for learning embeddings for nodes in a graph, in an embodiment.

FIG. 1 is a block diagram that depicts an example system 100 for learning embeddings for nodes in a graph, in an embodiment. System 100 includes client devices 112-116, a network 120, and a server system 130. Although only three client devices are depicted, many client devices may be communicatively coupled to server system 130 through network 120 and/or other networks (not depicted). Server system 130 comprises one or more computing elements that perform the operations described herein as being performed by server system 130.

Network 120 is a computer network, examples of which include a local area network (LAN), a wide area network (WAN), and the Internet.

Examples of client devices 112-116 include a desktop computer, a laptop computer, a tablet computer, a wearable device, a video game console, and a smartphone. A client device may receive content from server system 130 in response to transmitting a content request over network 120 to server system 130. Examples of a content request include a search request and a page request. A search request includes one or more query terms that are entered through the client device, such as through a physical keyboard of the client device or a graphical keyboard that is presented on a touchscreen display of the client device. A page request includes a uniform resource locator (URL) of a resource (e.g., web page) that server system 130 hosts.

A client application executing on the client device transmits the content request to server system 130. Examples of such a client application include (1) a web application that executes within a web browser that executes on the client device and (2) a native application that is installed on the client device and is configured to communicate with server system 130.

A client device may receive content from server system 130 not in response to a content request from the client device. For example, server system 130 identifies content that server system 130 determines is relevant to a user of the client device and sends, to the client device or to an account of the user, a notification of the content in the form of an instant message, a text message, an email message, a push notification, or an in-app notification. Later, the user, operating the client device or another device, views the notification and determines whether to select any links to content found in the notification, the links referencing content hosted by server system 130 and/or another computer system.

Server System

Server system 130 comprises a graph database 132, a machine-learning component 134, embedding database 136, 240, and an embedding consumer 138. Graph database 132 includes node data about a set of nodes and edge data about edges between nodes in the set of nodes. The nodes may represent one or more types of entities. (Nodes are often called vertices. These two terms are interchangeable.) For example, a node may represent a user, an organization, a content item, an attribute of a user (e.g., job title, job function, seniority, skill, industry, employment status), an attribute of an organization (e.g., industry, number of employees or members), or an attribute of a content item (e.g., keywords, creator, size, colors, whether text is included). There may be many different types of users, types of organizations, and/or types of content items. Example types of organizations include companies, charitable organizations, universities, trade schools, government agencies, sports clubs, churches, trade associations, and unions. Example types of content items include articles, posts, web pages, websites, comments, advertisements, and documents of any type.

Each node may be associated with a node identifier that uniquely identifies the node relative to all other nodes indicated in graph database 132. Similarly, each edge may be associated with an edge identifier that uniquely identifies the edge relative to all other edges indicated in graph database 132. An edge comprises a pair of node identifiers, which, together, may be used to uniquely identify the edge instead of having a separate edge identifier.

There may be many different types of edges between nodes. For example, if an edge exists between two nodes representing users, then the edge may be a connection type of edge, where the two users are connected in an online social network. Alternatively, the edge may indicate that a first user "follows" a second user, such that when the second user posts new content, the first user is automatically notified of the content. Alternatively, the edge may indicate that one user interacted with content that was authored by the other user. Examples of types of interactions with content include clicks, likes, shares, comments, saves, copies, and views (e.g., viewing a certain portion of video content).

An edge may exist between two nodes representing different types of entities. For example, an edge may exist between a user and a user attribute, such as job title or skill, indicating that the user has, or is associated with, that user attribute. As another example, an edge may exist between an organization and a content item indicating that the organization created or posted the content item on an online social network service. As another example, an edge may exist between a user and a content item indicating that the user interacted with the content item. Thus, an edge might not only identify two nodes, an edge might also indicate the type of relationship between the two nodes.

Different edges may be associated with different strengths or importance values. For example, a "comment" edge between a user and a content item may have a higher importance value than a "like" edge between a user and a content item. As another example, an "author" edge between a user and a content item may have a higher importance value than a "click" edge between a user and a content item. Such strength or important values may be predefined and may be used when sampling neighbors of a node.

Graph database 132, 240 may be implemented on one or more storage devices. For example, node data may be stored on one set of storage devices and edge data may be stored on another set of storage devices. In that scenario, when machine-learning component 134 automatically learns the embeddings that will be stored in embedding database 136 for user by embedding consumer 138, machine-learning component 134 may read, into volatile memory, first node data from one storage device and read, into the volatile member, first edge data from another storage device, in order to generate a portion of the overall graph that will be sampled and processed.

Embedding Database

Embedding database 136, 240 stores neural network embeddings (or simply "embeddings") that are automatically learned by machine-learned component 134. An embedding is a mapping of a discrete variable (e.g., a specific job title name, or a variable that represents an organization) to a vector of continuous numbers. In the context of neural networks, embeddings are low-dimensional, learned continuous vector representations of discrete variables. Embeddings are useful because they can reduce the dimensionality of categorical variables and meaningfully represent categories in the transformed space. The embeddings form the parameters (or "weights") of a neural network, which parameters are adjusted to minimize loss on a task. The resulting embeddings are representations of categories where similar categories, relative to the task, are closer to one another.

Generally, embeddings have multiple purposes, such as including finding nearest neighbors in the embedding space, as input to a machine learning model for a supervised task, and for visualization of concepts and relations between categories.

Embedding Consumer

Embedding consumer 138 takes embeddings stored in embedding database 136, 240 as input to produce output and makes decisions based on the output. Although only one embedding consumer 138 is depicted, server system 130 may comprise multiple embedding consumers.

An example of an embedding consumer 138 is a user recommendation engine that compares an embedding of a particular user with embeddings of other users (e.g., using a cosine similarity operation) to generate a similarity measure between pairs of embeddings, where each pair includes the embedding of the particular user. If the similarity measure is above a certain threshold, then data about the other user corresponding to the "similar" embedding is transmitted over computer network 120 to be presented on a screen of a computing device of the particular user. Alternatively, the similarity measure may be used as one of multiple inputs to a model (e.g., rule-based or machine-learned) that produces output that is used to determine whether to present the data to the particular user.

Another example of embedding consumer 138 is a skill recommendation engine that operates similar to the user recommendation engine, except that instead of comparing the particular user's embedding to embeddings of other users, the particular user's embedding is compared to embeddings of skills. If the particular user is not already associated with a skill but has an embedding that is relatively similar to the skill, then the skill may be presented to the particular user as a suggestion to include in a publicly visible profile of the particular user. Additionally or alternatively, the particular user may be considered associated with the skill (even though the skill is not listed in a profile of the particular user) and that association is used to identify job postings (that list the skill as required or helpful for job applicants to have) to present to the particular user as a suggestion.

Overview of Graph Neural Networks

Many learning tasks require dealing with graph data, which contains rich relation information among nodes or elements in the graph. Modeling physics systems, learning molecular fingerprints, predicting protein interface, and classifying diseases demand a model to learn from graph inputs. Graph neural networks (GNNs) are neural models that capture the dependence of graphs via message passing between nodes of the graphs. Thus, a GNN is a type of neural network that directly operates on a graph structure. A typical application of GNN is node classification but embodiments are not limited to this application. Other applications include link prediction, similarity search, and recommendation. In node classification, many nodes in a graph are associated with a label, and a goal is for a computer system to predict the label of nodes without a label.

Overview of Graph Convolutional Networks

In recent years, variants of GNNs, such as graph convolutional network (GCN), have demonstrated ground-breaking performance on many deep learning tasks. The "convolution" in "GCN" is a similar operation as the convolution in convolutional neural networks (CNNs). "Convolution" refers to multiplying the input neurons with a set of weights that are referred to as "filters" or "kernels." The filters act as a sliding window across the entirety of, for example, a digital image and enable CNNs to learn features from neighboring cells/pixels. Within the same layer, the same filter is used throughout the digital image. This is referred to as weight sharing. For example, using a CNN to classify images of cats versus non-cats, the same filter will be used in the same layer to detect the nose and the ears of the cat.

GCNs perform similar operations where the model learns the features by inspecting neighboring nodes. The major difference between CNNs and GCNs is that CNNs are specially built to operate on regular (Euclidean) structured data, while GCNs are the generalized version of CNNs where the numbers of connections for each node can vary and the nodes are unordered (irregular on non-Euclidean structured data). GCNs can be categorized into two major algorithms: Spatial Graph Convolutional Networks and Spectral Graph Convolutional Networks. However, embodiments can be applied to all types of GCNs and even GNNs.

Machine-Learning Component

Figure 2:
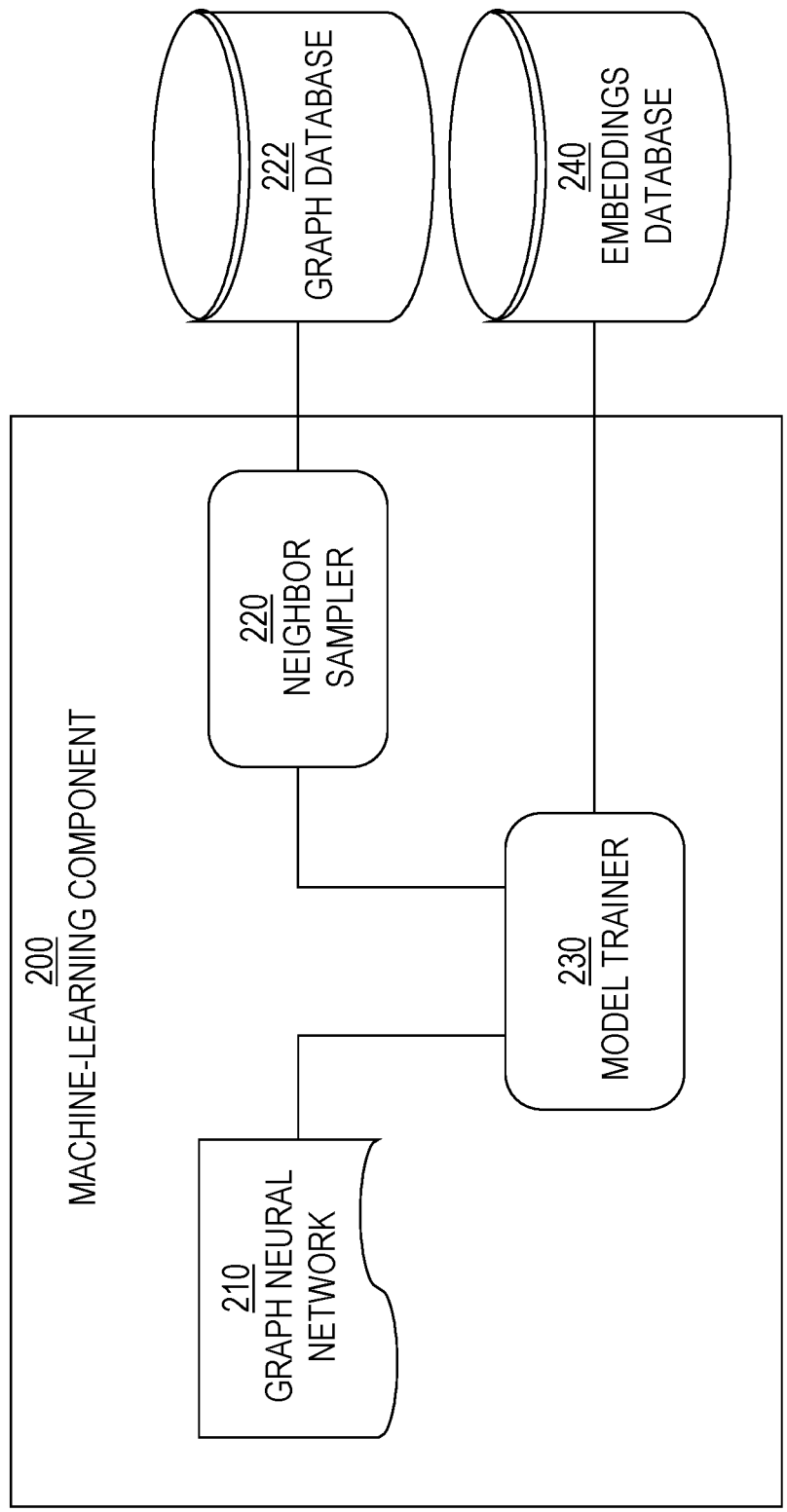
FIG. 2 is a block diagram that depicts elements of a machine-learning component, in an embodiment.

FIG. 2 is a block diagram that depicts elements of a machine-learning component 200, in an embodiment. Machine-learning component 200 corresponds to machine-learning component 134. Machine-learning component 200 includes a graph neural network 210, a neighbor sampler 220, and a model trainer 230. Neighbor sampler 220 and model trainer 230 may be implemented in software, hardware, or any combination of software and hardware.

Graph neural network 210 comprises an input layer, one or more hidden (intermediate) layers, and an output layer. Each layer comprises one or more neurons. Different layers may have a different number of neurons. A neuron receives one or more inputs and sums the input to produce an output (or activation, representing a neuron's action potential which is transmitted along its axon). Typically, each input is separately weighted and the sum is passed through a non-linear function known as an activation function or transfer function. An activation function usually has a sigmoid shape, but it may also take the form of another non-linear function, such as a piecewise linear function or a step function.

Neighbor sampler 220 samples one or more neighbors of a node given an identity of the node and graph database 222. Thus, input to neighbor sampler 230 is graph database 222, which corresponds to graph database 132. The identity of the given node may be included in a training instance that identifies the node and includes a label, such as a 0 or a 1, if the task is a binary classification, or a single hot-encoding where each bit corresponds to a possible classification and the "on" bit corresponds to a particular classification that is associated with the node. Examples of a particular classification include a specific job title or a specific industry.

An aggregation operation in GNNs is intended to complement a node's embedding with embeddings of the node's neighbors on the assumption that neighbors are informative for a target task, such as node classification or link prediction. This motivation is extended to the sampling policy by sampling neighbors that are informative of the target task. In other words, neighbor sampler 230 (along with the GNN) is trained to maximize the GNN performance. A key idea behind this training approach is to learn a sampling policy by propagating gradients of the GNN performance loss through a non-differentiable sampling operation.

Embeddings 230 of nodes in a graph G may be initialized randomly or may be initialized to embeddings that were learned using another process. Embeddings 230, along with weights of graph neural network 210, are modified (or "learned") during the back propagation process.

Notations

For ease of explanation of graph neural network 210 and the sampling policy, the following list of symbols and definitions is provided for frequently referenced elements:

$G=(V, E)$ is an input graph with nodes $v_i \in V$ and edges $(v_i, v_j) \in E$ N is number of nodes in V $A(N \times N)$ is an adjacency matrix of G L is the number of layers in a GNN model $D^{(l)}$ is a hidden dimension at the l-th hidden layer, where $l=0, 1, \ldots, L-1$ $H^{(0)}$ is an $N \times D^{(0)}$ input node feature matrix $h_i^{(0)}$ denotes the $D^{(0)}$ dimensional feature vector (or embedding) of node $v_i$ $H^{(l)}$ is an $N \times D^{(l)}$ hidden embeddings at the l-th layer $W^{(l)}$ is a learnable $D^{(l)} \times D^{(l+1)}$ transformation matrix at the l-th layer where $l=0, \ldots, L-1$ $\alpha(\bullet)$ is a nonlinear activation function $\alpha_{W(l)}(\bullet)$ is an abbreviation of $\alpha(W^{(l)} \ldots)$ $p(j|i)$ is a probability of sampling node $v_j$ given node $v_i$ $q(j|i)$ is an approximation of $p(j|i)$ The GCN model stack layers of first-order spectral filters followed by a nonlinear activation functions to learn node embeddings. When $h_i^{(l)}$ denotes the hidden embeddings of node $v_i$ in the l-th layer, the simple and general form of a GCN is as follows:

$$h_i^{(l+1)} = \alpha((1/N(i))\Sigma_{j=1}^N a(v_i, v_j) h_j^{(l)} W^{(l)}), l=0, \ldots, L-1$$

where $a(v_i, v_j)$ is set to 1 when there is an edge from $v_i$ to $v_j$, otherwise 0; $N(i) = \Sigma_{j=1}^N a(v_i, v_j)$ is the degree of node $v_i$; $\alpha(\bullet)$ is a nonlinear activation function; $W^{(l)} \in R^{D(l) \times D(l+1)}$ is the learnable transformation matrix in the l-th layer with $D^{(l)}$ denoting the hidden dimension at the l-th layer.

Learnable Sampling Policy

An example parameterized sampling policy $\{q^{(l)}(j|i)\}$ estimates the probability of sampling node $v_j$ given node $v_i$ at the l-th layer. In an embodiment, $q^{(l)}(j|i)$ is composed of two methodologies: importance sampling $\{q^{(l)}_{imp}(j|i)\}$ and random sampling $\{q^{(l)}_{rand}(j|i)\}$ as follows: (though in another embodiment, $q^{(l)}(j|i)$ is composed of just importance sampling):

$$q^{(l)}_{imp}(j|i) = (W_s \cdot h_i^{(l)}) \cdot (W_s \cdot h_j^{(l)}) \text{(which comprises three dot product operations)} \quad (1)$$

$$q^{(l)}_{rand}(j|j) = 1/N(i) \quad (2)$$

$$q^{-(l)}(j|i) = a_s \cdot [q^{(l)}_{imp}(j|i), q^{(l)}_{rand}(j|i)] \quad (3)$$

$$q^{(l)}(j|i) = q^{-(l)}(j|i) / \Sigma^{N(i)} q^{-(l)}(k|i) \quad (4)$$

where $W_s \in R^{D(s) \times D(l)}$ is a transformation matrix with $D^{(s)}$ denoting the hidden dimension in the sampling policy and $D^{(l)}$ denoting the hidden dimension of the l-th layer; $h^{(l)}_i$ is the hidden embedding of node $v_i$ at the l-th layer; N(i) is the degree of node $v_i$; $a_s \in R^{1 \times 2}$ is a learnable attention vector; and $q^{(l)}(\bullet|i)$ is normalized to sum to 1. $W_s$ and $a_s$ are learnable parameters of the sampling policy, which will be updated toward performance improvement, as described in more detail herein.

The first term (1) (i.e., $q^{(l)}_{imp}(j|i)$) computes the intermediate score of sampling $v_j$ given node $v_i$ in the l-th layer, corresponding to importance sampling. The hidden embeddings $h^{(l)}_i$ and $h^{(l)}_j$ are mapped into the $D^{(s)}$ dimension through the transformation matrix $W_s$, then a similarity between these two embeddings are computed by dot product.

The second term (2) (i.e., $q^{(l)}_{rand}(j|i)=1/N(i)$) assigns the same sampling probability to each node in the neighborhood, defined as all nodes connected to node $v_i$. When a graph is well-clustered, nodes are connected with all informative neighbors. Thus, random sampling becomes effective since its randomness helps aggregate diverse neighbors, which prevents the GNN from overfitting. By capitalizing on both importance sampling and random sampling, the sampling policy may better generalize across various graphs.

The attention $a_s$ regulates the tradeoff between importance sampling and random sampling. Attention vector $a_s$ learns which sampling methodology is more effective on a given task. Attention vector $a_s$ may be initialized with higher attention to random sampling than to importance sampling, which allows the model to examine a broad scope of neighbors at first.

While sampling policy $q^{(l)}(j|i)$ assigns a distinct sampling probability to each edge at each layer, the sampling policy shares the parameters ($W_s$, $a_s$) across all edges and layers. This parameter sharing helps the GNN model generalize and prevents the sampling policy from overfitting to the training set.

Figure 3A:
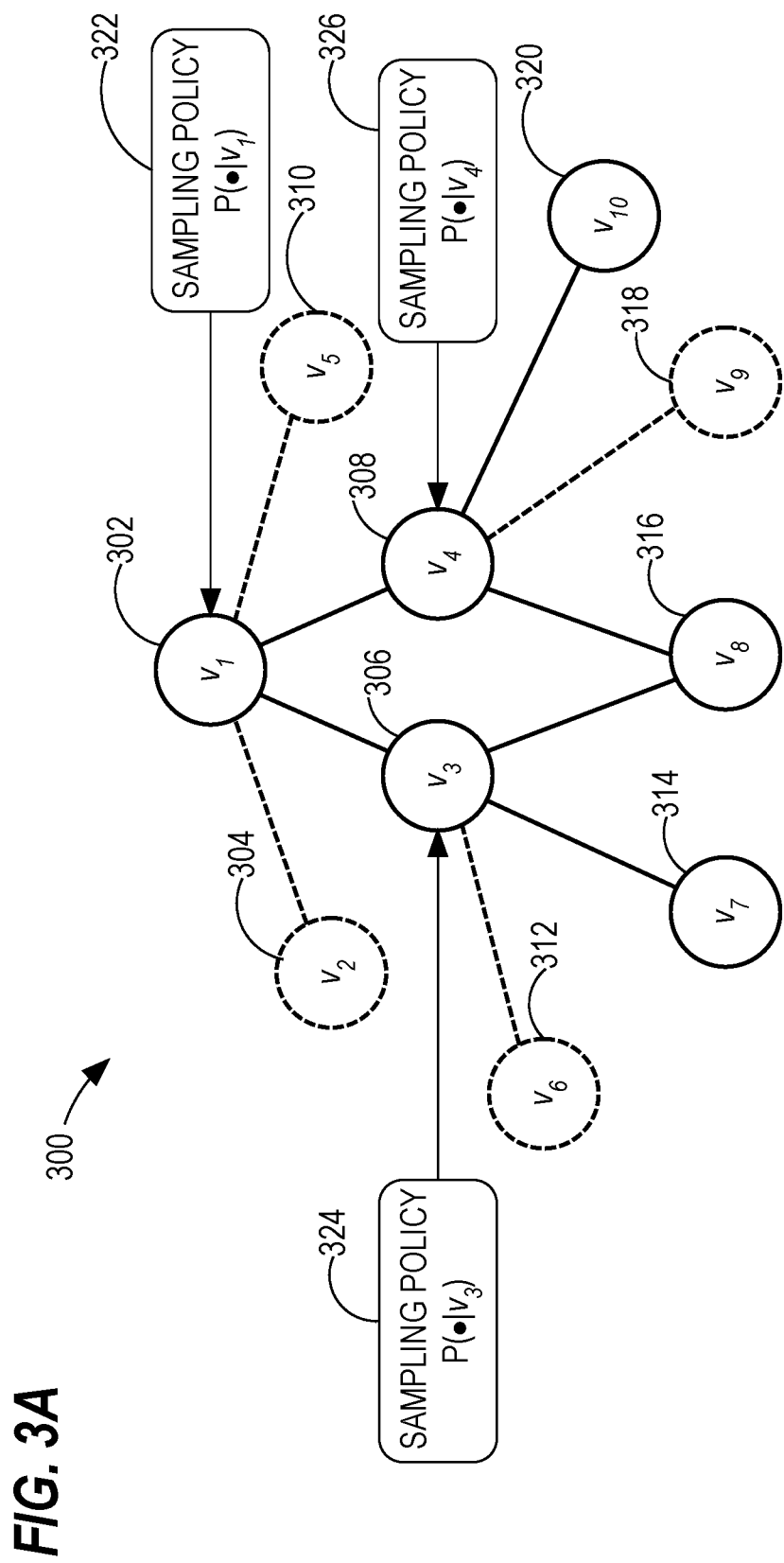
FIG. 3A is a block diagram that depicts an example result of using a sampling policy to sample neighbors of nodes in a graph.

FIG. 3A is a block diagram that depicts an example result 300 of using a sampling policy to sample nodes in a graph, beginning with vertex $v_1$. Result 300 indicates that, given vertex $v_1$ 302, vertices $v_3$ 306 and $v_4$ 308 were selected (from among vertices $v_2$-$v_5$ 304-310) using the sampling policy. Instance 322 reflects an invoking of the sampling policy relative to vertex $v_1$ 302, which considers a neighborhood of vertices that is unique to vertex $v_1$ 302. Then, given vertex $v_3$ 306, vertices $v_7$ 314 and $v_8$ 316 were selected (from among vertices $v_6$-$v_8$ 312-316) using the same sampling policy. Instance 324 reflects an invoking of the sampling policy relative to vertex $v_3$ 306, which considers a neighborhood of vertices that is unique to vertex $v_3$ 306. Also, given vertex $v_4$ 308, vertices $v_8$ 316 and $v_{10}$ 320 were selected (from among vertices $v_8$-$v_{10}$ 316-320) using the same sampling policy. Instance 326 reflects an invoking of the sampling policy relative to vertex $v_4$ 308, which considers a neighborhood of vertices that is unique to vertex $v_4$ 308.

Figure 3B:
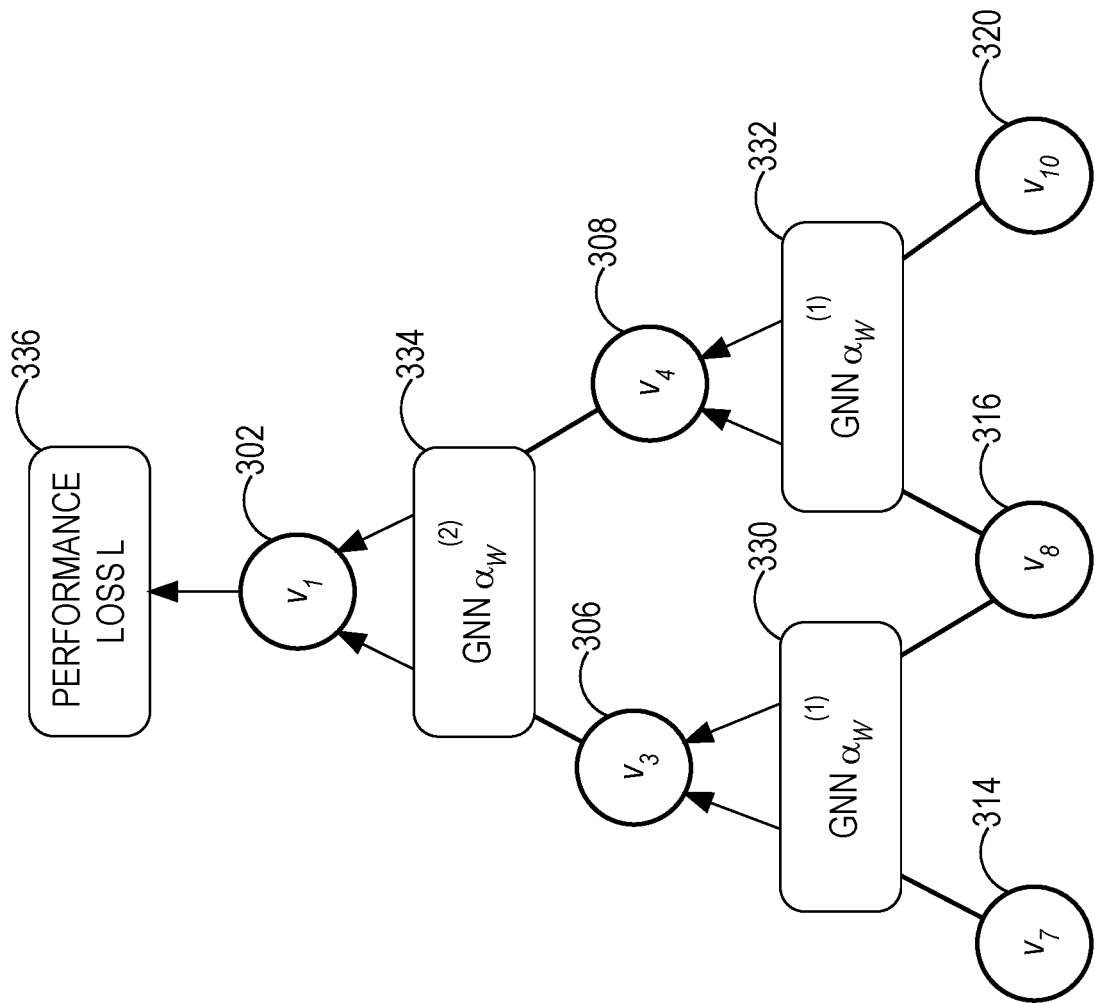
FIG. 3B is a block diagram that depicts an example result of computing a performance loss using the sampled nodes and a graph neural network that comprises two hidden layers.

FIG. 3B is a block diagram that depicts an example result 310 of computing a performance loss 336 using the sampled nodes and a GNN that comprises two hidden layers. In this example, each layer takes embeddings of two vertices as input. However, in different implementations, the number of neighbors sampled (and, thus, embeddings input) may be much larger, such as twenty or fifty. In this example, embeddings of vertices $v_7$ 314 and $v_8$ 316 are input into an instance 330 of the first hidden layer of the GNN while embeddings of vertices $v_8$ 316 and $v_{10}$ 320 are input into an instance 332 of the first hidden layer of the GNN. The output of instances 330-332 and the embeddings for vertices $v_3$ 306 and $v_4$ 308 are input to the second hidden layer 334. The output of second hidden layer 334 and the embedding for vertex $v_1$ 302 are input into a sigmoid function along with a label (e.g., a classification label indicating one of many classes or indicating whether two vertices are connected) to produce performance loss 336. Examples of performance loss include cross entropy for node classification, softmax cross entropy, and mean squared error.

Learning Parameters of the Sampling Policy Function

Figure 3C:
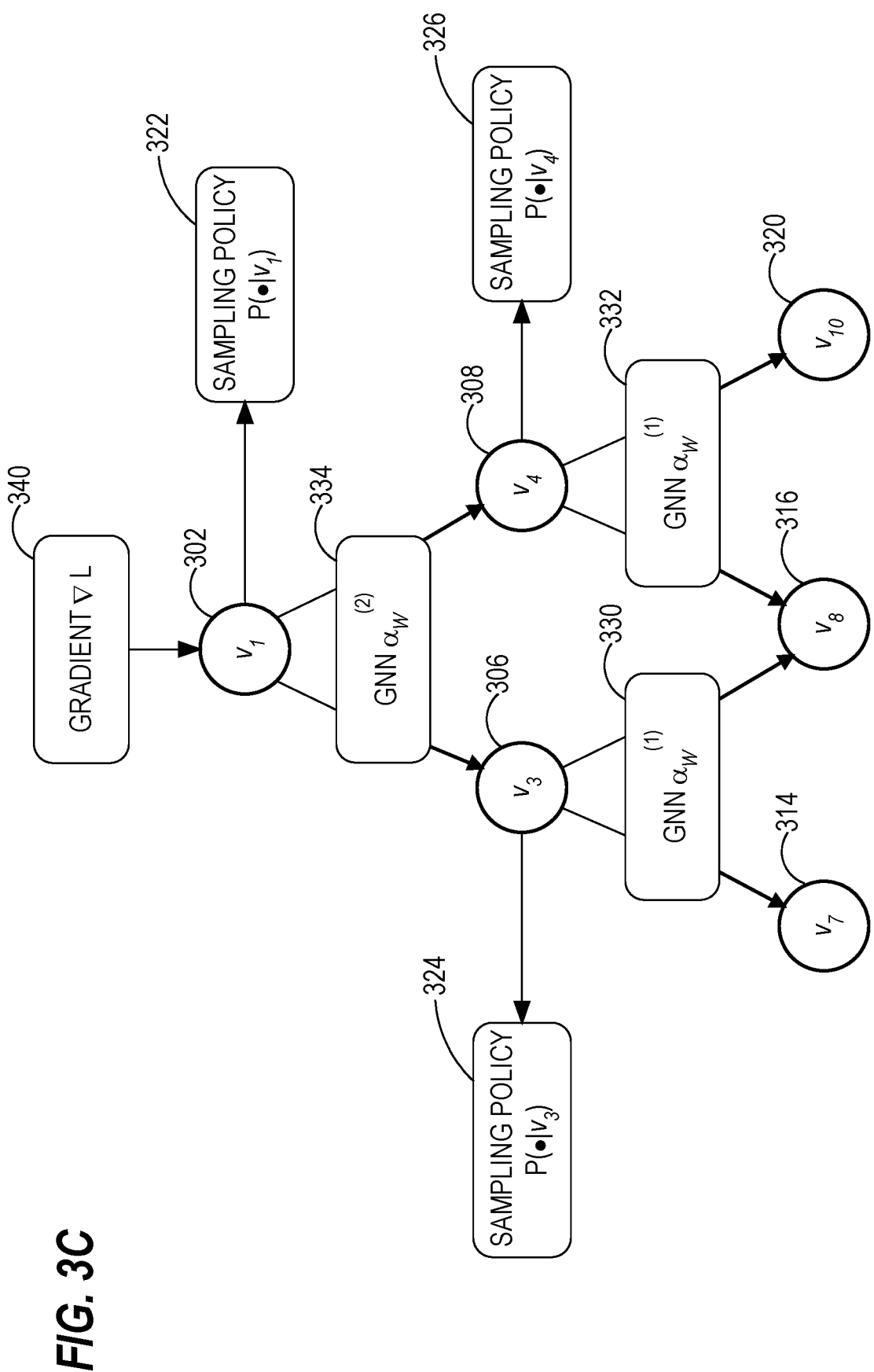
FIG. 3C is a block diagram that depicts back propagating a gradient of performance loss to update a graph neural network and a sampling policy, in an embodiment.

FIG. 3C is a block diagram that depicts back propagation after performance loss 340 is computed, in an embodiment. Specifically, machine-learning component 200 backpropagates the gradients of performance loss 340 through (1) the GNN and (2) the sampling policy function to update the sampling policy function, which is non-differentiable. As FIG. 3C indicates, the sampling policy function may be updated one or more times at each layer in the GNN. Parameters of the sampling policy function that are updated include $W_s$ and, if present as part of the sampling policy function, $a_s$.

The gradient of the performance loss L with respect to the sampling policy $q_\theta^{(l)}(j|i)$ (i.e., $\nabla_\theta L$), where $\theta$ denotes parameters ($W_s$, $a_s$) in sampling policy $q_\theta^{(l)}$, may be computed as follows:

$$\nabla_\theta L = (dL/dh_i^{(l+1)}) \alpha_{W(l)} E_{j \sim q(l)\theta(j|i)}[\nabla_\theta \log q_\theta^{(l)}(j|i) h_j^{(l)}]$$

The gradient of $h_i^{(l+1)}$ with respect to $\theta$ (i.e., $dh_i^{(l+1)}/d\theta$) may be computed as follows:

$$dh_i^{(l+1)}/d\theta = \alpha_{W(l)}(E_{j \sim q(l)\theta(j|i)}[\nabla_\theta \log q_\theta^{(l)}(j|i) h_j^{(l)}])$$

To derive this latter equation, a log derivative trick is used, which involves leveraging a property of the logarithm $\nabla_\theta \log q_\theta = \nabla_\theta q_\theta / q_\theta$ to transform a sum into an expectation under $q_\theta$. Thus, a logarithm operation is performed in order to apply a gradient of a performance loss to a non-differentiable function, i.e., without computing a derivative. In the backpropagation phase, model trainer 230 uses the log derivative trick to pass gradients of the loss from the GNN to the sampling policy through an expectation operation. In reinforcement learning, the log derivative trick is used to compute the gradient of the expectation of a scalar function, such as a reward function. However, model trainer 230 applies the log derivative trick to compute the gradient of an expectation of vectors (or matrices for a batch implementation) located in the middle of the GNN.

The updated values in the sampling policy are computed as follows:

$$W_s' = W_s - (L * dh_i^{(l+1)}/dW_s)$$

$$a_s' = a_s - (L * dh_i^{(l+1)}/da_s)$$

where $W_s'$ and $a_s'$ represent updated weights.

In an embodiment, the log derivative trick requires hand-crafted backpropagation, or backpropagation whose logic is derived manually, i.e., not using off-the-shelf backpropagation solutions. Such an implementation requires computing $dL/dh_i^{(l)}$, computing $dh_i^{(l)}/d\theta$ using the log derivative trick, multiply both to output $dL/d\theta$, and finally updating $\theta$ manually using $dL/d\theta$. In an alternative embodiment, model trainer 230 uses a backpropagation mechanism that is built in deep learning, examples of which include PyTorch TensorFlow. In this embodiment, model trainer 230 computes an auxiliary loss $L_{aux} = dL/dh_i^{(l)} \cdot h_i^{(l)}$ and then calls the backpropagation function of a deep learning framework on $L_{aux}$ to compute the gradient with respect to $\theta$.

The log derivative trick is one technique in order to update the sampling policy based on the performance loss of a GNN. Other techniques to update the sampling policy include Gumbel-softmax (for continuous probabilities) and a re-parameterization trick (for discrete probabilities).

Effect of Modified Sampling Policy Function

As described herein, GNNs train their parameters to move the node embeddings $h_i^{(l)}$ in the direction (i.e., the gradient $-dL/dh_i^{(l)}$ that minimizes the performance loss L. Neighbor sampler 220 promotes this process by sampling neighbors whose embeddings are aligned with the gradient $-dL/dh_i^{(l)}$.

When a node's embedding ($h_i^{(l)}$) is aggregated with the embedding $h_j^{(l)}$ of a sampled neighbor that is aligned with the gradient, the node's embedding $h_i^{(l)}$ moves in the direction that reduces the performance loss L. In other words, neighbor sampler 220 determines that a neighbor node $v_j$ is informative if the neighbor node's embedding ($h_j^{(l)}$) is aligned with the gradient $-dL/dh_i^{(l)}$.

Figure 4:
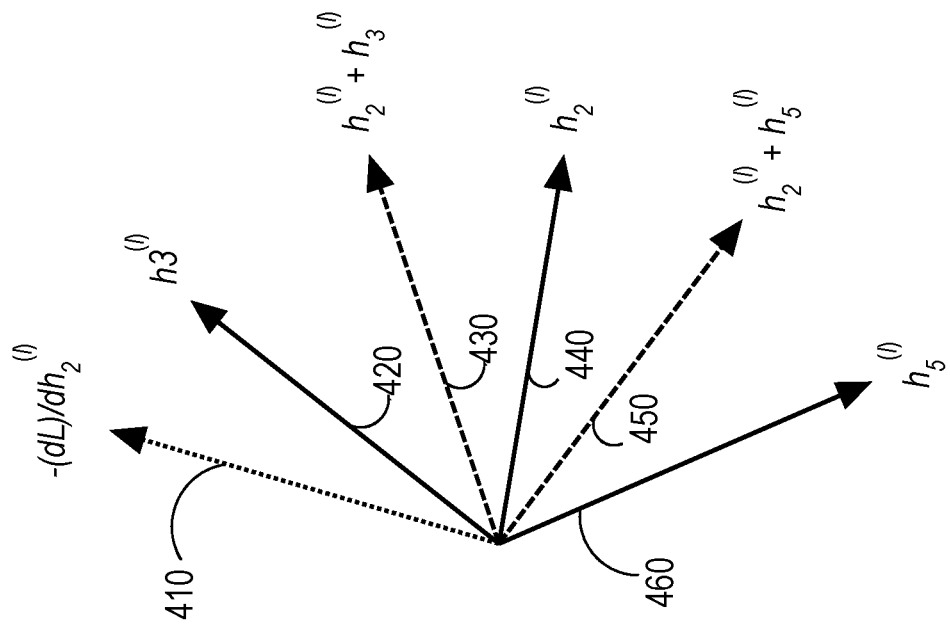
FIG. 4 is a block diagram that depicts a simplified version of vector space with different node embeddings and combination of node embeddings in that vector space, in an embodiment.

FIG. 4 is a block diagram that depicts a simplified version of vector space with different node embeddings and combinations of node embeddings in that vector space, in an embodiment. FIG. 4 illustrates why neighbor sampler 220 assigns a higher sampling probability to one node over another. In this depicted example, neighbor sampler 220 assigns a higher sampling probability to node $v_3$ than $v_5$ given source node $v_2$ because node $v_3$'s embedding ($h_3^{(l)}$), represented by arrow 420, if aggregated with $v_2$'s embedding ($h_2^{(l)}$), represented by arrow 440, moves $v_2$'s embedding ($h_2^{(l)}$) in the direction $-dL/dh_2^{(l)}$, which decreases the performance loss L. Arrow 410 represents the gradient $dL/dh_2^{(l)}$ in vector space while arrow 430 represents a combination of 122's embedding ($h_2^{(l)}$) and $v_3$'s embedding ($h_3^{(l)}$) in the vector space. In contrast, aggregating the embedding of node $v_5$ ($h_5^{(l)}$) with $v_2$'s embedding ($h_2^{(l)}$) would move $v_2$'s embedding ($h_2^{(l)}$) in the opposite direction. Arrow 460 represents 122's embedding ($h_2^{(l)}$) in vector space while arrow 450 represents a combination of $v_2$'s embedding ($h_2^{(l)}$) and $v_5$'s embedding ($h_5^{(l)}$) in the vector space. Therefore, neighbor sampler 220 considers $v_3$ more informative than $v_5$ since $h_3^{(l)}$ is better aligned with $-dL/dh_2^{(l)}$, thus helping $h_2^{(l)}$ move towards loss reduction.

Process Overview

Figure 5:
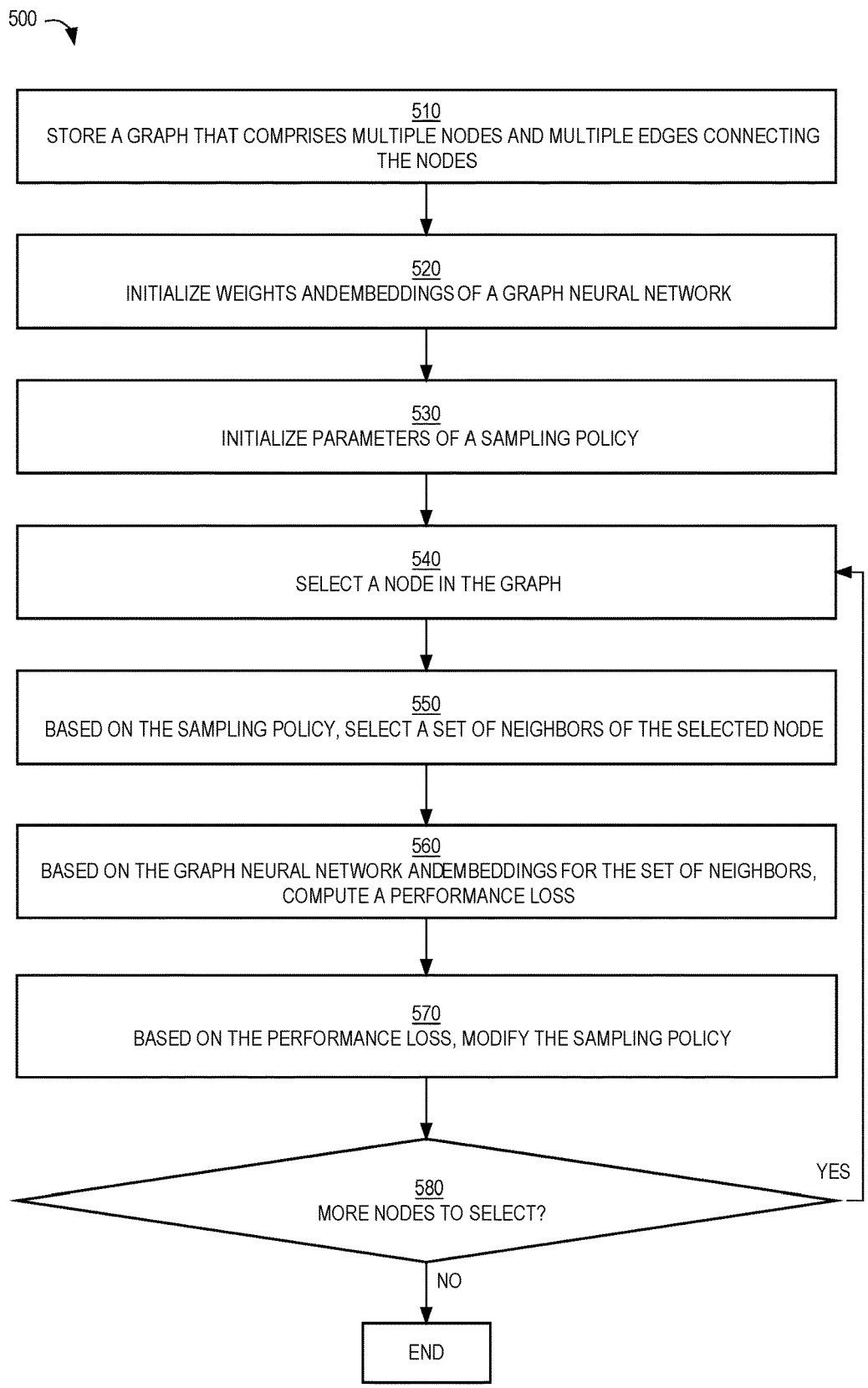
FIG. 5 is a flow diagram that depicts an example process for training a neighbor sample policy for sampling neighbors to train a graph neural network.

FIG. 5 is a flow diagram that depicts an example process 500 for training a neighbor sample policy for sampling neighbors when training a graph neural network, in an embodiment. Process 500 may be performed by different components of server system 130 and machine-learning component 200.

At block 510, a graph that comprises a plurality of nodes and a plurality of edges connecting the plurality of nodes is stored. Such a graph may be stored in graph database 132.

At block 520, an embedding for each node in the plurality of nodes is initialized. Machine-learning component 200 may perform the initialization. Also, weights in a graph neural network (GNN) may be initialized.

At block 530, a sampling policy for sampling neighbors of nodes is initialized. Model trainer 230 of machine-learning component 200 may perform this initialization. Block 530 may involve assigning random values in the sampling policy's transformation matrix.

A block 540, a node in the graph is selected. Block 540 may involve identifying a training instance in training data (that is used to train the GNN) and identifying a node that is indicated therein. The training instance may be randomly selected.

At block 550, based on the sampling policy, a set of neighbors of the selected node is selected. The sampling policy involves an importance sampling component and, optionally, a random sampling component. An example of blocks 540-550 is depicted in FIG. 3A.

At block 560, based on the GNN and embeddings for the set of neighbors, a performance loss is computed. Block 560 involves forward propagation, an example of which is depicted in FIG. 3B.

At block 570, based on the performance loss, the sampling policy is modified. For example, the sampling policy's transformation matrix ($W_s$) is modified such that the likelihood of sampling neighbors that improve model performance increases. Block 570 also involves modifying the GNN (which includes the embeddings) based on a gradient of the performance loss.

At block 580, it is determined whether to select more nodes. Block 580 may involve determining whether there are any more training instances that have not yet been considered for training the GNN. If so, then process 500 returns to block 540 where another node in the graph is selected. Otherwise, process 500 ends. The learned embeddings may be leveraged by one or more downstream consumers, such as embedding consumer 138.

Different Tasks

In an embodiment, model trainer 230 trains a different GNN and instance of neighbor sampler 220 for different tasks. For example, one task may be classifying a node as being associated with a certain industry, while another task may be determining whether two nodes of a certain type (e.g., user type) should be linked or have a connection in an online connection network. Even though both tasks may rely on the same graph of nodes and edges to train the respective GNNs and even though both GNNs have the same structure (e.g., number of hidden layers and number of neurons per layer), the weights and parameters of the respective GNNs and the neighbor sampler may be very different. Thus, even though machine-learning component 200 is depicted as including a single GNN and a single neighbor sampler, in other embodiments, machine-learning component 200 comprises multiple GNNs (each corresponding to a different task) and multiple neighbor samplers (each corresponding to a different task).

Accordingly, the same node in the graph may be associated with a different embedding. For example, one embedding for a first user may be used by a first embedding consumer (leveraging a first machine-learned model) to predict a job title of the first user while another embedding for the first user may be used by a second embedding consumer (leveraging a second machine-learned model) to predict whether the first user will select a user recommendation indicating a second user that the first user is not yet connected to in an online connection graph.

Once a GNN is trained using one of the sampling techniques described herein, the GNN may be leveraged to produce output that is used by a system (e.g., server system 130) to make a decision. For example, for industry classification, a learned embedding for a user is input into a trained GNN, which outputs a set of values, each value corresponding to a different candidate industry. The candidate industry that is associated with the highest value may be selected and used to automatically update a profile of the user. Alternatively, the candidate industries with the top N values may be presented to the user on a screen of a computing device of the user when the user visits a webpage affiliated with server system 130, after which the user may select one of the presented candidate industries to include in the user's profile. As another example, for link prediction, one or more heuristics are used to identify a relatively large set of candidate users that may be future connections of a particular user. Then, an embedding of the particular user and an embedding for each candidate user in the set is determined (e.g., based on the embeddings that are learned using a sampling technique) and input in a trained GNN, which outputs a value that is used to determine whether to present information (about the candidate user) that prompts the particular user to send an electronic invitation to the candidate user to connect in an online connection network. The higher the outputted value, the more likely that the particular user is to select the prompt to send the electronic invitation to the candidate user.

Robustness

Robustness of an algorithm refers to the algorithm's performance in light of adversarial attacks, which may be considered one type of noise in the data that is being analyzed. There are two different types of adversarial attacks in graph data: (1) fake connections among existing nodes, and (2) fake neighbors with random feature vectors. These two types of attacks are common in real-world graphs. The "fake connection" scenario simulates connections made by mistake or unfit for purpose (e.g., connections between family members in a job search platform). The "fake neighbor" scenario simulates fake accounts with random attributes used for fraudulent activities.

In experiments that involved simulating these two types of attacks, embodiments have shown robustness since machine-learning component 200 (or, specifically, model trainer 230), learns which neighbors are informative from gradients of the performance loss. Results show that the optimization of the sampling policy toward performance brings robustness when combatting graph noise. On the other hand, other sampling techniques, such as pure random sampling, result in poor model performance since those techniques do not distinguish between good/true neighbors and bad/fake neighbors.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
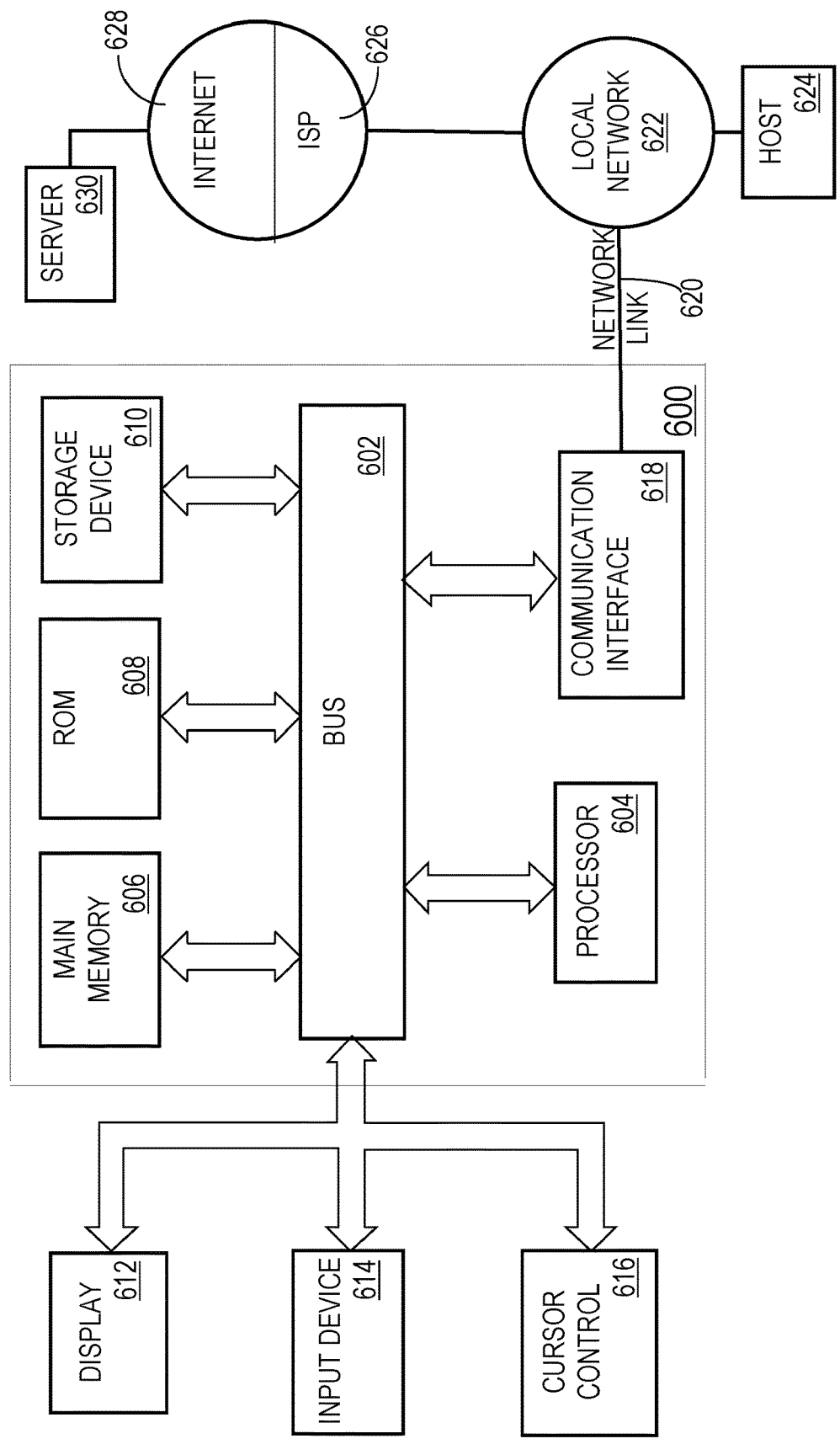
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a graph that comprises a plurality of nodes and a plurality of edges connecting the plurality of nodes;
    initializing an embedding for a node in the plurality of nodes;
    initializing a sampling policy for sampling neighbors of nodes;
    using one or more machine learning techniques to train a graph neural network and learn a plurality of embeddings for the plurality of nodes, wherein using the one or more machine learning techniques comprises:
    for the node:
    selecting, based on the sampling policy, a set of neighbors of the node;
    based on the graph neural network and embeddings for the node and the set of neighbors, computing a task performance loss for an entity-to-user recommendation task;
    computing a gradient of the task performance loss with respect to the sampling policy;
    backpropagating the gradient of the task performance loss from the graph neural network to the sampling policy through an expectation operation to produce an updated sampling policy;
    updating the embedding using the graph neural network and the updated sampling policy to produce an updated embedding; and
    causing generating a recommendation via the entity-to-user recommendation task using the updated embedding.

2. The method of claim 1, wherein the sampling policy comprises a sampling operation that includes an importance sampling component that computes, for each neighbor in the set of neighbor of said each node, a product that is based on a transformation matrix, an embedding of said each node, and an embedding of said each neighbor.

3. The method of claim 2, wherein the product is of (1) a first product of the transformation matrix and the embedding of said each node and (2) a second product of the transformation matrix and the embedding of said each neighbor.

4. The method of claim 2, wherein the sampling operation includes:
    a random sampling component that computes a probability of selecting each neighbor in the set of neighbors;
    a learnable attention vector that regulates a tradeoff between the importance sampling component and the random sampling component.

5. The method of claim 1, further comprising:
    for each neighbor of a plurality of neighbors of said each node, computing, based on the sampling policy, a selection probability that indicates a probability of selecting said each neighbor, wherein the selection probability is based on the embedding of said each node and the embedding of said each neighbor;
    wherein selecting the set of neighbors comprises selecting the set of neighbors from among the plurality of neighbors based on the selection probability of said each neighbor in the plurality of neighbors.

6. The method of claim 1, wherein:
    modifying the sampling policy comprises performing a logarithm operation to update a transformation matrix of the sampling policy using the gradient of the performance loss, wherein the sampling policy comprises a non-differentiable function.

7. The method of claim 1, wherein:
    the graph neural network is a first graph neural network that is trained for a first task;
    training the first graph neural network results in a first plurality of embeddings for the plurality of nodes;
    the method further comprising training a second graph neural network for a second task that is different than the first task;
    wherein training the second graph neural network results in a second plurality of embeddings for the plurality of nodes.

8. The method of claim 7, further comprising:
    retrieving, by a first embedding consumer, from the first plurality of embeddings, a first embedding that corresponds to a first node in the plurality of nodes;
    determining, by the first embedding consumer, based on the first embedding, whether to perform a first operation with respect to an entity that corresponds to the first node;
    retrieving, by a second embedding consumer that is different than the first embedding consumer, from the second plurality of embeddings, a second embedding that corresponds to the first node in the plurality of nodes;
    determining, by the second embedding consumer, based on the second embedding, whether to perform a second operation with respect to the entity that corresponds to the first node.

9. The method of claim 1, wherein the graph neural network is a graph convolutional network.

10. The method of claim 1, further comprising:
    determining, for a particular user, an embedding that is based on one or more embeddings of the plurality of embeddings;
    generating an output based on inputting the embedding into the graph neural network;
    based on the output, at least one of:
    associating a class, from among a plurality of classes, with the particular user,
    identifying data about a plurality of other users to present to the particular user, or
    identifying an entity to present to the particular user as a recommendation.

11. The method of claim 1, wherein embeddings of the nodes in the graph are learned via the backpropagating.

12. The method of claim 11, further comprising:
providing the learned embeddings to a recommendation engine.

13. One or more storage media storing instructions which, when executed by one or more processors, cause:
storing a graph that comprises a plurality of nodes and a plurality of edges connecting the plurality of nodes;
initializing an embedding for a node in the plurality of nodes;
initializing a sampling policy for sampling neighbors of nodes;
using one or more machine learning techniques to train a graph neural network and learn a plurality of embeddings for the plurality of nodes, wherein using the one or more machine learning techniques comprises:
for the node:
selecting, based on the sampling policy, a set of neighbors of the node;
based on the graph neural network and embeddings for the node and the set of neighbors, computing a task performance loss for an entity-to-user recommendation task;
computing a gradient of the task performance loss with respect to the sampling policy;
backpropagating the gradient of the task performance loss from the graph neural network to the sampling policy through an expectation operation to produce an updated sampling policy;
updating the embedding using the graph neural network and the updated sampling policy to produce an updated embedding; and
causing generating a recommendation via the entity-to-user recommendation task using the updated embedding.

14. The one or more storage media of claim 13, wherein the sampling policy comprises a sampling operation that includes an importance sampling component that computes, for each neighbor in the set of neighbor of said each node, a product that is based on a transformation matrix, an embedding of said each node, and an embedding of said each neighbor.

15. The one or more storage media of claim 14, wherein the product is of (1) a first product of the transformation matrix and the embedding of said each node and (2) a second product of the transformation matrix and the embedding of said each neighbor.

16. The one or more storage media of claim 14, wherein the sampling operation includes:
a random sampling component that computes a probability of selecting each neighbor in the set of neighbors;
a learnable attention vector that regulates a tradeoff between the importance sampling component and the random sampling component.

17. The one or more storage media of claim 13, wherein the instructions, when executed by the one or more processors, further cause:
for each neighbor of a plurality of neighbors of said each node, computing, based on the sampling policy, a selection probability that indicates a probability of selecting said each neighbor, wherein the selection probability is based on the embedding of said each node and the embedding of said each neighbor;
wherein selecting the set of neighbors comprises selecting the set of neighbors from among the plurality of neighbors based on the selection probability of said each neighbor in the plurality of neighbors.

18. The one or more storage media of claim 13, wherein:
modifying the sampling policy comprises performing a logarithm operation to update a transformation matrix of the sampling policy using the gradient of the performance loss, wherein the sampling policy comprises a non-differentiable function.

19. The one or more storage media of claim 13, wherein:
the graph neural network is a first graph neural network that is trained for a first task;
training the first graph neural network results in a first plurality of embeddings for the plurality of nodes;
wherein the instructions, when executed by the one or more processors, further cause training a second graph neural network for a second task that is different than the first task;
wherein training the second graph neural network results in a second plurality of embeddings for the plurality of nodes.

20. The one or more storage media of claim 19, wherein the instructions, when executed by the one or more processors, further cause:
retrieving, by a first embedding consumer, from the first plurality of embeddings, a first embedding that corresponds to a first node in the plurality of nodes;
determining, by the first embedding consumer, based on the first embedding, whether to perform a first operation with respect to an entity that corresponds to the first node;
retrieving, by a second embedding consumer that is different than the first embedding consumer, from the second plurality of embeddings, a second embedding that corresponds to the first node in the plurality of nodes;
determining, by the second embedding consumer, based on the second embedding, whether to perform a second operation with respect to the entity that corresponds to the first node.

21. The one or more storage media of claim 13, wherein the graph neural network is a graph convolutional network.

22. The one or more storage media of claim 13, wherein the instructions, when executed by the one or more processors, further cause:
determining, for a particular user, an embedding that is based on one or more embeddings of the plurality of embeddings;
generating an output based on inputting the embedding into the graph neural network;
based on the output, at least one of:
associating a class, from among a plurality of classes, with the particular user,
identifying data about a plurality of other users to present to the particular user, or
identifying an entity to present to the particular user as a recommendation.

* * * * *